US009089009B2

(12) United States Patent
Trapp et al.

(10) Patent No.: US 9,089,009 B2
(45) Date of Patent: Jul. 21, 2015

(54) ELECTRIC HEATING SYSTEM, IN PARTICULAR FOR A HYBRID VEHICLE OR ELECTRIC VEHICLE

(75) Inventors: Ralph Trapp, Paderborn (DE); Hans-Dieter Röhling, Lippstadt (DE)

(73) Assignee: BEHR-HELLA THERMOCONTROL GMBH, Stuttgart, Baden-Württemberg (DE)

(*) Notice: Subject to any disclaimer, the term of this patent is extended or adjusted under 35 U.S.C. 154(b) by 460 days.

(21) Appl. No.: 13/504,019

(22) PCT Filed: Mar. 29, 2011

(86) PCT No.: PCT/EP2011/054775

§ 371 (c)(1),
(2), (4) Date: Jul. 10, 2012

(87) PCT Pub. No.: WO2011/120946

PCT Pub. Date: Oct. 6, 2011

(65) Prior Publication Data

US 2012/0267355 A1 Oct. 25, 2012

(30) Foreign Application Priority Data

Mar. 30, 2010 (DE) ........................ 10 2010 013 372

(51) Int. Cl.
*B60L 1/02* (2006.01)
*H05B 3/26* (2006.01)

(52) U.S. Cl.
CPC .......... *H05B 3/265* (2013.01); *H05B 2203/003* (2013.01); *H05B 2203/013* (2013.01); *H05B 2203/016* (2013.01); *H05B 2203/023* (2013.01)

(58) Field of Classification Search
CPC ............ H05B 3/12; H05B 3/50; H05B 3/265; H05B 2203/003; H05B 2203/016; H05B 2203/013; F24H 3/0405; F24H 3/0429; F24H 3/0435; F24H 3/0441; F24H 3/0458; F24H 3/0452; F24H 3/0464; F24H 3/047; B60H 1/2225; B60H 2001/2234; B60H 2001/2237; B60H 2001/2231; B60H 2001/2228; B60H 2001/224; B60H 2001/2246; B60H 2001/2256; B60H 2001/2259; B60H 2001/2265
USPC ........................................................ 219/202
See application file for complete search history.

(56) References Cited

U.S. PATENT DOCUMENTS

| | | | | |
|---|---|---|---|---|
| 2005/0175328 A1* | 8/2005 | Pierron et al. | ................ | 392/347 |
| 2006/0082433 A1 | 4/2006 | Parsons | | |

FOREIGN PATENT DOCUMENTS

| | | |
|---|---|---|
| EP | 1164816 A2 | 12/2001 |
| EP | 1657963 A1 | 5/2006 |
| FR | 2855933 A1 | 12/2004 |

OTHER PUBLICATIONS

International Search Report dated Jun. 17, 2011 for corresponding PCT Application No. PCT/EP2011/054775 (4 pgs.).

*Primary Examiner* — Shawntina Fuqua
(74) *Attorney, Agent, or Firm* — Shumaker & Sieffert, P.A.

(57) ABSTRACT

The electric heating system, in particular for a hybrid vehicle or electric vehicle, is provided with a heating module. The heating module is provided with an electrically insulating, heat conducting ceramic substrate which has a heating zone and a control zone which are spaced apart from one another. The heating module comprises an electrical resistance heating element which is arranged on the ceramic substrate, in the heating zone thereof, and which is embodied as a resistance heating conductor which is mounted on the ceramic substrate. Further, the heating module comprises a transistor for controlling the current through the resistance heating conductor, wherein the transistor and other optionally present electrical components and conductor tracks are arranged in the control zone on the ceramic substrate. The heating module is provided with a first cooling element which is thermally coupled to the heating zone of the ceramic substrate.

12 Claims, 3 Drawing Sheets

ELECTRIC HEATING SYSTEM, IN PARTICULAR FOR A HYBRID VEHICLE OR ELECTRIC VEHICLE

The invention relates to an electric heating system which is in particular suitable for use in a hybrid vehicle or electric vehicle.

Electric heating systems comprising PTC elements are known in the art. Since 12 V on-board electrical systems are normally used in conventional motor vehicles, considerable amounts of current flow through the PTC elements, said current being controlled via power transistors. Said transistors generate relatively high power losses for which reason they must be cooled. This, in turn, increases the design complexity.

In the upcoming vehicle generation of the hybrid vehicles and electric vehicles the associated increase in the vehicle voltage to several 100 V results in a considerable decrease of the current load for electric heating systems and their heating elements. Since the electric heating systems are now full heating systems, an electric heat output is required which is three times as high as that of conventional PTC auxiliary heating systems.

The use of high voltage on-board electrical systems of approximately 400 V in motor vehicles allows for reduction of the current strength to attain higher heat output than in electrical heaters for low voltage on-board electrical systems (e. g. 24 V), which further allows the cross section of supply lines to be reduced. However, high voltage applications require hermetically sealed heating elements with a high electric strength which should further be scoop-proof and moisture-resistant.

It is an object of the invention to provide an electric heating system, in particular for hybrid vehicles or electric vehicles, which meets the aforementioned requirements.

According to the invention, this object is achieved with an electric heating system, in particular for a hybrid vehicle or electric vehicle, which is provided with

- a heating module which is provided with
  - an electrically insulating, heat conducting ceramic substrate which has a heating zone and a control zone which are spaced apart from one another,
  - an electrical resistance heating element which is arranged on the ceramic substrate, in the heating zone thereof, and which is embodied as a resistance heating conductor which is mounted on the ceramic substrate,
  - a transistor for controlling the current through the resistance heating conductor, wherein the transistor and other optionally present electrical components and conductor tracks are arranged in the control zone on the ceramic substrate, and
  - a first cooling element which is thermally coupled to the heating zone of the ceramic substrate.

According to the invention, the reduction of the maximum current load due to the use of high voltage on-board electrical systems allows a ceramic panel heating strip, in particular with an imprinted resistance heating conductor, to be used as an alternative to the PTC heating elements. The homogeneous allover heat generation is advantageous, whereas with the conventional PTC heating systems only a selective heat input (hot spot) takes place.

According to the invention, an electrically insulating, heat conducting ceramic substrate is used for the electric heating system, said ceramic substrate comprising a heating zone and a control zone which are arranged on a common side or on different sides of the ceramic substrate and which are spaced apart from one another in the planar extension of the ceramic substrate. Within the heating zone of the ceramic substrate a resistance heating element is located which is configured as a resistance heating conductor applied to the ceramic substrate, in particular by paste printing. In the control zone of the ceramic substrate a transistor for controlling the current through the resistance heating conductor is located, wherein, besides the transistor, other electrical components and conductor tracks may be optionally arranged within the control zone. The heating zone of the ceramic substrate is thermally coupled to a (first) cooling element.

In the design according to the invention, the ceramic substrate is a combination of both conductor board and heating system, wherein the arrangement of the heating zone and the control zone, as well as the cooling element allow for realizing a total heat conductivity of the heating module which ensures that the transistor and the other optionally provided electrical components, if any, are not overheated. The dissipation of the heat generated within the heating zone via the first cooling element and from there to the outside is thus rated such that the function of the transistor and other optionally provided components is not affected by heat.

Advantageously, the (first) cooling element extends across the overall ceramic substrate against one side of which the (first) cooling element rests in a thermally coupled manner. Preferably, the resistance heating element and the control zone are located on the opposite side of the ceramic substrate. That portion of the heat generated in the heating zone which travels through the ceramic substrate to the control zone is thus transported from the control zone to the first cooling element and dissipated by the first cooling element to the outside.

In an advantageous embodiment of the invention the resistance heating conductor is covered by a ceramic cover element extending across the heating zone of the ceramic substrate, said ceramic cover element being connected with the ceramic substrate to form a compound structure, and a second cooling element is provided which rests in a thermally conducting manner against the ceramic cover element and extends across the heating zone, wherein the compound structure composed of the ceramic substrate and the ceramic cover element is located between the two cooling elements. In this embodiment of the invention, the resistance heating conductor and thus the heating zone are covered by a ceramic cover element such that a second cooling element can be arranged at the ceramic cover, said second cooling element being thermally coupled to the ceramic cover. The ceramic heating element (ceramic substrate, resistance heating element and ceramic cover element) is thus sandwiched between cooling elements. To ensure operational safety, it is advantageous if the compound structure composed of the ceramic substrate and the ceramic cover element is tightly sealed to the outside to prevent gases and/or fluids from entering said compound structure, which further results in a high electric strength. Thus the heating module is scoop-proof and moisture resistant.

Advantageously, a passivation layer covering the resistance heating conductor is provided on the heating zone of the ceramic substrate. The passivation layer is preferably configured as a glass passivation layer.

Due to the sandwich-type covering of the resistance heating element (resistance heating conductor) by ceramic elements (ceramic substrate and ceramic cover), an easy to install and scoop-proof heating element is provided which is protected against damage. The sandwich-type ceramic exterior shells allow the heating element to be arranged without any difficulty between two cooling elements, wherein the ceramic elements protect the electrical resistance heating conductor against damage.

Advantageously, the resistance heating conductor is provided in the form of resistance paste printing. This method allows for easy manufacture of the resistance heating conductor.

In an advantageous embodiment of the invention, the connection of the ceramic cover element with the (glass) passivation layer is provided by a glass solder layer via which the ceramic cover element is "fused" with the passivation layer.

Advantageously, the electric heating system according to the invention comprises a temperature sensor which is arranged within the control zone and whose output signal is adapted to be supplied to an evaluation and control unit for carrying out temperature monitoring with a view to protection against overheating. The temperature on the ceramic substrate is thus permanently sensed and limited. For the purpose of temperature monitoring and the resultant temperature limitation, the flow of the current of the resistance heating conductor can be permanently measured. Thus a defined temperature/resistance ratio allows the respective temperature of the heating element to be derived on the basis of the current characteristic. In this embodiment, the temperature is determined by means of a temperature sensor primarily with a view to redundancy and operational safety of the electric heating system.

The design according to the invention involving the use of a heating element in the form of a ceramic heating strip ($Al_2O_3$) allows for a conductor board layout destined for placement of a driver output stage in the control zone on the heating ceramic. The spatial arrangement of the placement zone (control zone) in spaced relationship to the heating zone as well as the heat conduction factor of the ceramic material used define the heat input from the heating zone into the control zone, wherein this heat input is further defined by the heat dissipation to the first and/or the second cooling element. Control of the output and temperature limitation protect a driver output stage in a fixed thermal compound against overheating without any additional effort being required.

In a preferred embodiment of the invention it is further provided that a plurality of heating modules each comprising two cooling elements, which include cooling fins extending to opposite sides of the heating module, are arranged in a holding frame where they are disposed side by side, wherein the cooling fins of the cooling elements arranged in facing relationship of two neighboring heating modules mesh with each other. For making the flow resistance gradient uniform across the cross section of the electric heating system it is advantageous if the holding frame comprises cover portions at its edges extending along the cooling fins of the exterior cooling elements, said cover portions projecting beyond the cooling fins and covering them such that the flow resistance of these cooling elements, whose cooling fins do not mesh with the cooling fins of neighboring cooling elements, can be adjusted to the flow resistance prevalent in the area of meshing cooling fins.

Hereunder an embodiment of the invention is described in detail with reference to the drawings in which.

Figure 1:
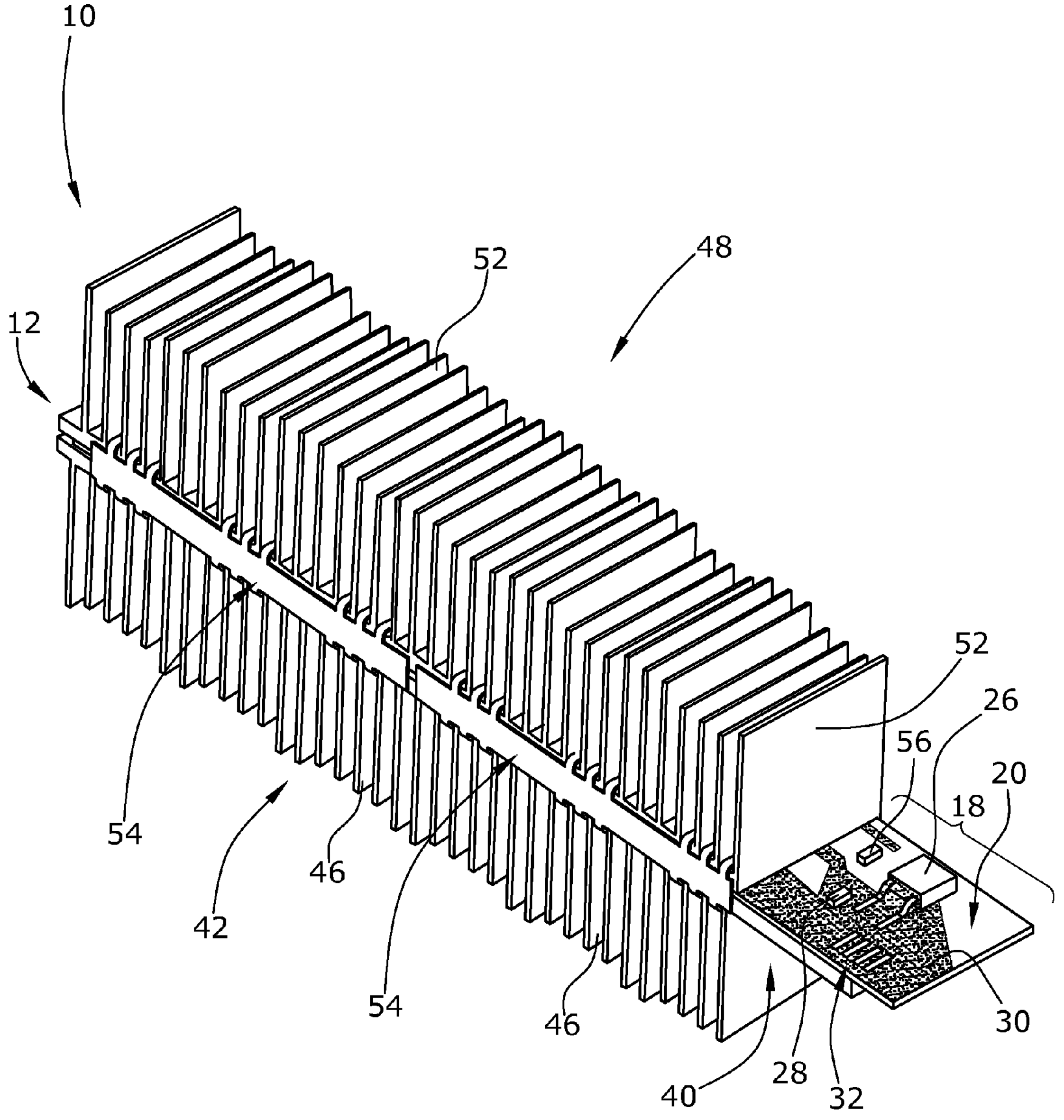
FIG. 1 shows a perspective view of a heating module.
Figure 2:
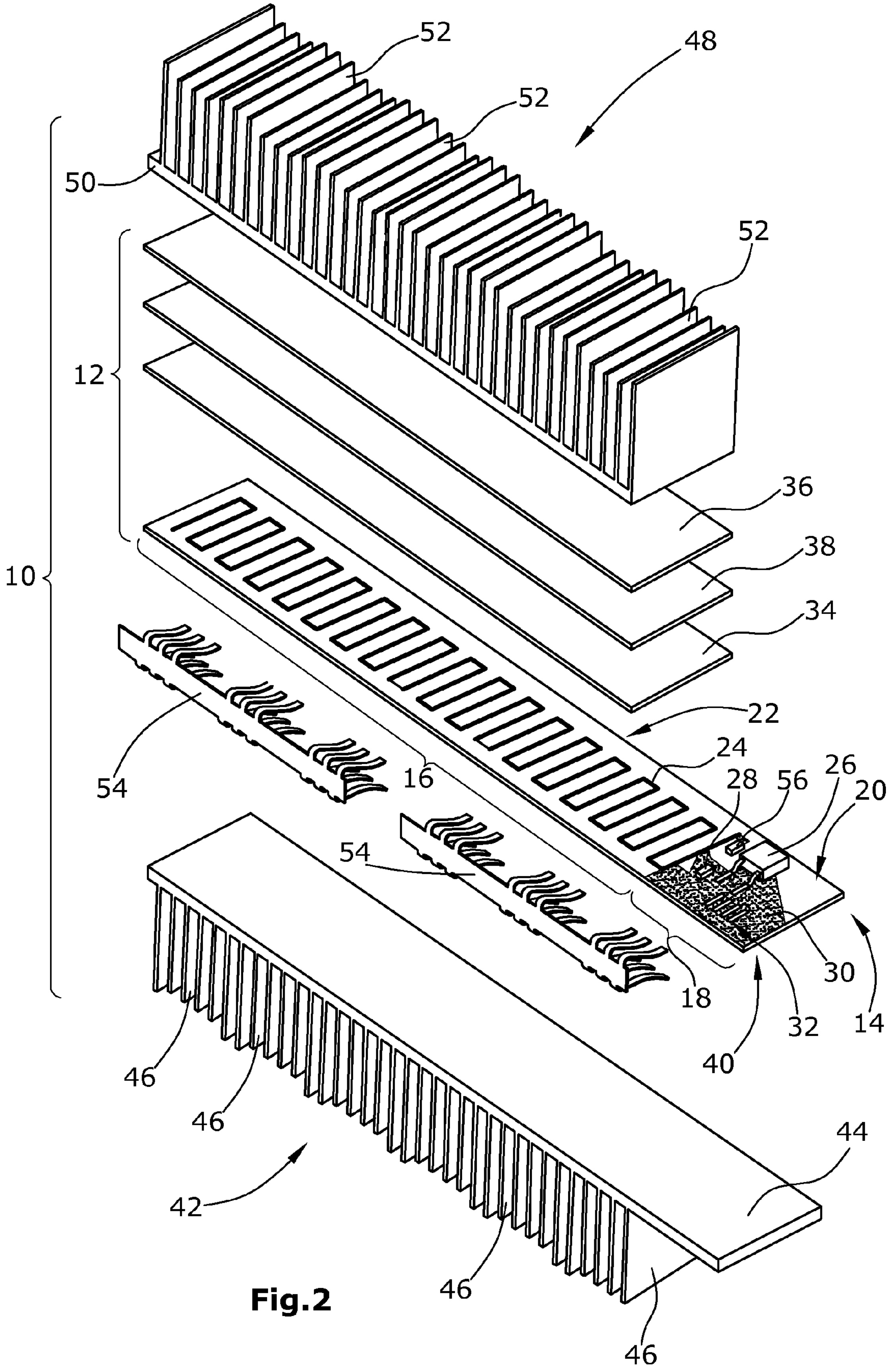
FIG. 2 shows an exploded view of the heating element of FIG. 1.

FIG. 1 shows a perspective view of a heating module 10 whose configuration is shown in the perspective and exploded view of FIG. 2. The heating module 10 is designed for use in high voltage on-board electrical systems of up to 400 V in vehicles, in particular hybrid vehicles or electric vehicles. The heating module 10 comprises a central electrical heating element 12 which has a layer composition as will be described below. The heating element 12 comprises a ceramic substrate 14 which is divided into a heating zone 16 and a control zone 18. Both zones 16,18 are located on the upper side 20 in FIG. 2 of the ceramic substrate 14. Within the heating zone 16 a resistance heating element 22 in the form of a resistance heating conductor 24, whose current is controlled by a transistor 26, is provided on the ceramic substrate 14, in particular by means of the paste printing method. The transistor 26 and other electrical components 28 are located within the control zone 18 which further comprises a conductor track layout 30 including contact areas 32.

The heating zone 16 is covered by a glass passivation layer 34. Above the glass passivation layer 34 a ceramic cover element 36 is arranged which is connected with the glass passivation layer 34 via a glass solder layer 38. The ceramic cover element 36 ends in the area of the transition between the heating zone 16 and the control zone 18 such that the components in the control zone 18 are exposed. The overall compound structure composed of ceramic substrate 14, glass passivation layer 34, glass solder layer 38 and ceramic cover element 36 is hermetically sealed and shows a high electric strength and is thus scoop-proof and moisture resistant.

A first cooling element 42 rests against the lower side 40 in FIG. 2 of the ceramic substrate 14, said first cooling element extending across the overall extension of the heating zone 16 and the control zone 18. The first cooling element 42 is made of a heat conducting metallic material, such as an aluminum alloy, and comprises a base plate 44 having a plurality of individual cooling fins 46 projecting therefrom. A second cooling element 48 rests on the ceramic cover element 36, said second cooling element being thermally coupled to the ceramic cover element 36 in the same manner as the first cooling element 42 is thermally coupled to the ceramic substrate 14. The second cooling element 48 has a configuration similar to that of the first cooling element 42 and includes a base plate 50 comprising cooling fins 52 extending therefrom. Both cooling elements 42,48 are held together by clamping elements 54 and thus are clamped to both sides of the heating element.

Via the two cooling elements 42,48 the heat generated in the heating zone 16 is dissipated to the outside, wherein the overall heating module 10 is designed such that the control zone 18, although arranged immediately next to the heating zone 16, can be kept at a temperature which does not affect the function of the electrical components. A temperature sensor 56 can sense the temperature of the control zone 18, which allows for temperature monitoring. Such temperature monitoring can further be realized by deriving the temperature of the heating element 12 from the current characteristic of the resistance heating conductor. Preferably, the temperature of the ceramic substrate is permanently monitored. The temperature monitoring allows for an electronic temperature and thus output limitation of the heating element 12. Further, the transistor 26 is protected against overheating.

Figure 3:
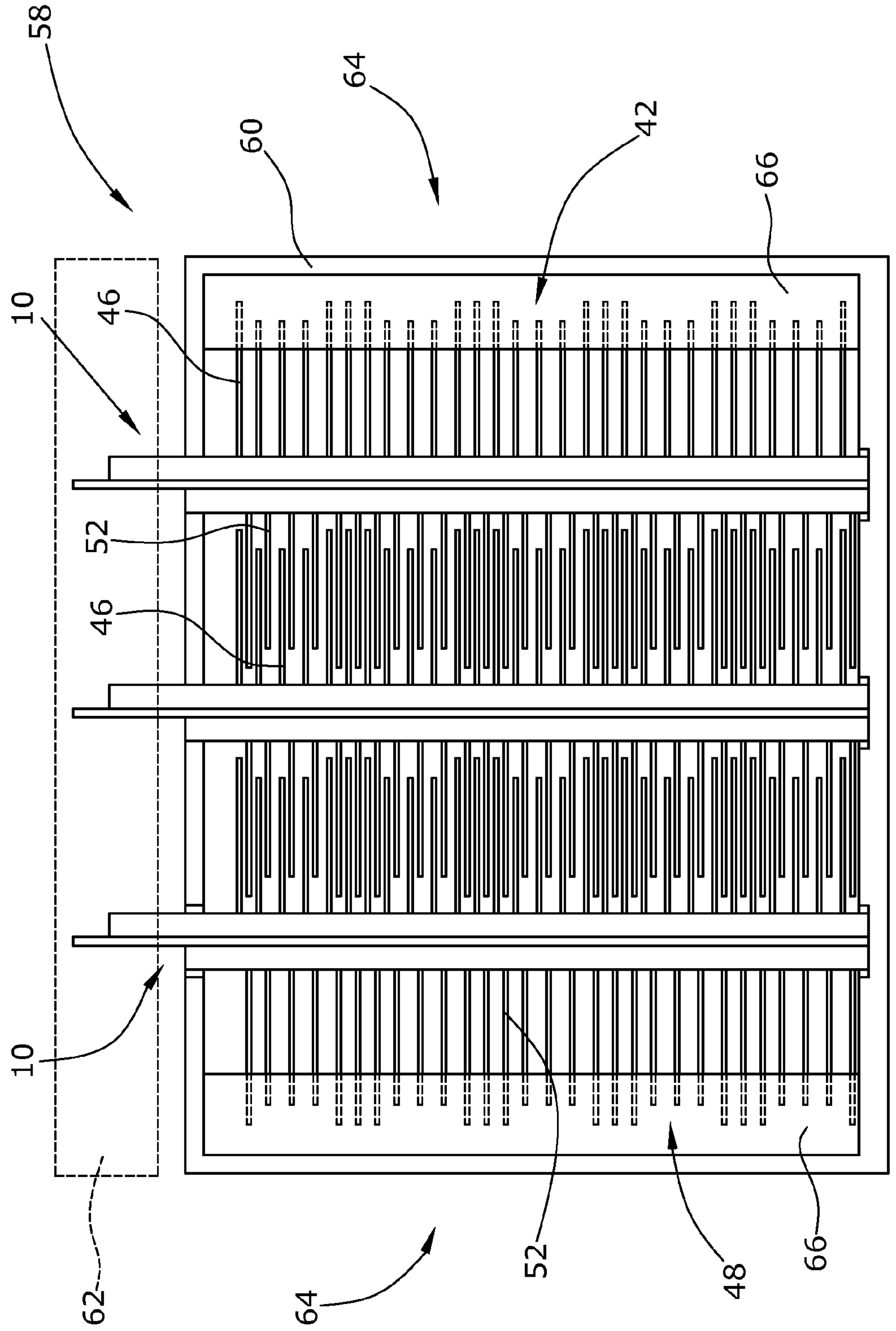
FIG. 3 shows a view of an electric heating system comprising a plurality of heating modules as shown in FIGS. 1 and 2.

A plurality of heating modules 10 as shown in FIGS. 1 and 2 can be combined to form an electric heating system 58 as shown in FIG. 3. As illustrated in FIG. 3, the electric heating system 58 comprises a frame 60 in which three heating modules 10 are arranged side by side in this embodiment. Here, the cooling fins 46 and 52 of the neighboring cooling elements 42 and 48 of heating elements 12 arranged side by side mesh with each other. The contact areas 32 of the control zones 18 of the heating modules 10 are electrically connected with a control and evaluation unit 62. Due to the meshing cooling fins 46,52 the electric heating system 58 has a higher flow resistance across its flow cross section between the neighboring heating modules 10 than in the area of the cooling elements 42,48 located outside relative to the electric heating system 58. To attain in these areas, too, a flow resistance adjusted to the flow resistance prevalent between the heating elements 10, the frame sections 64 extending on both sides in FIG. 3 comprise covers 66 which partly cover the cooling fins 46,52.

LIST OF REFERENCE NUMERALS

10 Heating module
12 Heating element
14 Ceramic substrate
16 Heating zone
18 Control zone
20 Upper side
22 Resistance heating element
24 Resistance heating conductor
26 Transistor
28 Components
30 Conductor track layout
32 Contact areas
34 Glass passivation layer
36 Ceramic cover element
38 Glass solder layer
40 Lower side
42 First cooling element
44 Base plate
46 Cooling fins
48 Second cooling element
50 Base plate
52 Cooling fins
54 Clamping elements
56 Temperature sensor
58 Heating system
60 Holding frame
62 Evaluation and control unit
64 Frame sections
66 Cover sections of the frame

The invention claimed is:

1. An electric heating system for a hybrid vehicle or electric vehicle, the electric heating system comprising:

a heating module which is provided with:

an electrically insulating, heat conducting ceramic substrate which has a heating zone and a control zone which are spaced apart from one another, an electrical resistance heating element which is arranged on the ceramic substrate, in the heating zone thereof, and which is embodied as a resistance heating conductor which is mounted on the ceramic substrate, a transistor for controlling the current through the resistance heating conductor, wherein the transistor and other optionally present electrical components and conductor tracks are arranged in the control zone on the ceramic substrate, and a first cooling element which is thermally coupled to the heating zone of the ceramic substrate.

2. The electric heating system according to claim 1, wherein the heating zone and the control zone are arranged on a common side the ceramic substrate or on different sides of the ceramic substrate.

3. An electric heating system for a hybrid vehicle or electric vehicle, the electric heating system comprising:

a heating module which is provided with:

an electrically insulating, heat conducting ceramic substrate which has a heating zone and a control zone which are spaced apart from one another, an electrical resistance heating element which is arranged on the ceramic substrate, in the heating zone thereof, and which is embodied as a resistance heating conductor which is mounted on the ceramic substrate, a transistor for controlling the current through the resistance heating conductor, wherein the transistor and other optionally present electrical components and conductor tracks are arranged in the control zone on the ceramic substrate, and a first cooling element which is thermally coupled to the heating zone of the ceramic substrate, wherein the heating zone and the control zone are provided on a common first side the ceramic substrate, and that wherein the first cooling element rests in a thermally conducting manner against the second side of the ceramic substrate opposite the first side the ceramic substrate and extends across the full area of the second side of the ceramic substrate opposite the heating and control zones.

4. An electric heating system for a hybrid vehicle or electric vehicle, the electric heating system comprising:

a heating module which is provided with:

an electrically insulating, heat conducting ceramic substrate which has a heating zone and a control zone which are spaced apart from one another, an electrical resistance heating element which is arranged on the ceramic substrate, in the heating zone thereof, and which is embodied as a resistance heating conductor which is mounted on the ceramic substrate, a transistor for controlling the current through the resistance heating conductor, wherein the transistor and other optionally present electrical components and conductor tracks are arranged in the control zone on the ceramic substrate, and a first cooling element which is thermally coupled to the heating zone of the ceramic substrate, wherein the resistance heating conductor is covered by a ceramic cover element extending across the heating zone of the ceramic substrate, the cover element being connected with the ceramic substrate to form a compound structure, and wherein a second cooling element is provided which rests in a thermally conducting manner against the ceramic cover element and extends across the heating zone wherein the compound structure composed of the ceramic substrate and the ceramic cover is located between the two cooling elements.

5. The electric heating system according to claim 4, wherein a passivation layer covering the resistance heating conductor is provided on the heating zone of the ceramic substrate.

6. The electric heating system according to claim 5, wherein a glass solder layer for ensuring a tight connection is arranged between the passivation layer and the ceramic cover element.

7. The electric heating system according to claim 1, further comprising a temperature sensor which is arranged within the control zone and whose output signal is adapted to be supplied to an evaluation and control unit for monitoring the temperature for the purpose of protection against overheating.

8. The electric heating system according to claim 1, further comprising a plurality of heating modules, each having two cooling elements which comprise cooling fins extending towards opposite sides of a heating module, and a holding frame is in which the heating modules are held in a side by side arrangement, wherein the cooling fins of the mutually facing cooling elements of two neighboring heating modules interleave with each other.

9. The electric heating system according to claim 8, wherein the cooling fins of the exterior cooling elements of the two heating modules which are the farthest apart from each other are partly covered by cover sections of the holding frame.

10. The electric heating system according to claim 1, wherein the ceramic substrate provides a planar shape.

11. The electric heating system according to claim 1, wherein the electrical resistance heating element which is arranged on the ceramic substrate is disposed on a surface of the ceramic substrate.

12. The electric heating system according to claim 11, wherein the electrical resistance heating element which is arranged on the ceramic substrate is in the form of resistance paste printing on the ceramic substrate.

* * * * *